US009587690B2

(12) United States Patent
Boffelli (10) Patent No.: US 9,587,690 B2
(45) Date of Patent: Mar. 7, 2017

(54) BRAKE DISC ASSEMBLY FOR A WHEEL (71) Applicant: Wabtec Holding Corp., Wilmerding, PA (US)

(72) Inventor: Roberto Boffelli, Camisano (IT)

(73) Assignee: Wabtec Holding Corp., Wilmerding, PA (US)

(*) Notice: Subject to any disclaimer, the term of this patent is extended or adjusted under 35 U.S.C. 154(b) by 0 days.

(21) Appl. No.: 14/783,946

(22) PCT Filed: Apr. 11, 2014

(86) PCT No.: PCT/US2014/033775
§ 371 (c)(1),
(2) Date: Oct. 12, 2015

(87) PCT Pub. No.: WO2014/169196
PCT Pub. Date: Oct. 16, 2014

(65) Prior Publication Data
US 2016/0076613 A1 Mar. 17, 2016

Related U.S. Application Data (60) Provisional application No. 61/811,316, filed on Apr. 12, 2013.

(51) Int. Cl.
*F16D 65/12* (2006.01)
*F16D 65/847* (2006.01)
*F16D 65/02* (2006.01)

(52) U.S. Cl.
CPC ......... *F16D 65/124* (2013.01); *F16D 65/121* (2013.01); *F16D 65/123* (2013.01);
(Continued)

(58) Field of Classification Search
CPC ...... F16D 65/12; F16D 65/121; F16D 65/124; F16D 65/847; F16D 2065/1312; B60T 1/065
(Continued)

(56) References Cited

U.S. PATENT DOCUMENTS 3,618,729 A * 11/1971 Ely .......................... F16D 13/62
188/218 XL
3,804,213 A * 4/1974 Lucien .................... F16D 55/40
188/218 XL
(Continued)

FOREIGN PATENT DOCUMENTS

DE 2315134 10/1974
DE 8816836 U1 9/1990
(Continued)

*Primary Examiner* — Christopher Schwartz
(74) *Attorney, Agent, or Firm* — The Webb Law Firm (57) ABSTRACT A brake disc for providing a braking surface on a rotating body, such as a railway wheel is provided. The brake disc includes a plurality of arcuate segments (126) arranged to form a ring and a plurality of joining elements (38) for connecting the segments to adjacent segments. Each segment includes: an inner side configured to contact a surface of a wheel; an outer side having a braking surface for contacting a braking mechanism; at least one socket (140) on each radial end (142) of the segment (126) for receiving one of the plurality of joining elements (38); and a groove on the inner side of the segment configured to receive a coupling member to form a pivot joint (58) for positioning the segment (126) on the surface of the wheel.

21 Claims, 7 Drawing Sheets (52) U.S. Cl.
 CPC ......... *F16D 65/128* (2013.01); *F16D 65/847* (2013.01); *F16D 2065/132* (2013.01); *F16D 2065/1312* (2013.01); *F16D 2065/1316* (2013.01); *F16D 2065/1328* (2013.01); *F16D 2065/1332* (2013.01); *F16D 2065/1392* (2013.01)

(58) Field of Classification Search
 USPC ............................ 188/218 A, 218 R, 218 XL
 See application file for complete search history.

(56) References Cited

U.S. PATENT DOCUMENTS

| | | | |
|---|---|---|---|
| 4,132,294 A * | 1/1979 | Poli | F16D 65/123 |
| | | | 188/218 XL |
| 4,199,044 A * | 4/1980 | Ivens | B61H 5/00 |
| | | | 188/218 XL |
| 5,010,985 A | 4/1991 | Russell et al. | |
| 5,101,940 A | 4/1992 | Mungo et al. | |
| 5,150,774 A | 9/1992 | Adamson | |
| 5,158,511 A | 10/1992 | Mungo | |
| 5,379,869 A | 1/1995 | Fox | |
| 5,788,026 A * | 8/1998 | Poli | F16D 65/124 |
| | | | 188/218 XL |
| 6,808,050 B2 | 10/2004 | Lehmann et al. | |
| 8,770,355 B2 | 7/2014 | Gaspers et al. | |
| 2007/0215418 A1 | 9/2007 | Wirth et al. | |

FOREIGN PATENT DOCUMENTS

| | | |
|---|---|---|
| DE | 69011279 T2 | 11/1994 |
| DE | 10047980 A1 | 4/2002 |
| DE | 202009006067 U1 | 8/2009 |
| DE | 202010001995 U1 | 5/2010 |
| DE | 202009013476 U1 | 3/2011 |
| DE | 202011050872 U1 | 1/2013 |
| EP | 0062774 A1 | 10/1982 |
| EP | 0644349 A1 | 3/1995 |
| EP | 0758059 A1 | 2/1997 |
| EP | 0683331 B1 | 10/1998 |
| FR | 1287967 A | 3/1962 |
| WO | 0196758 A1 | 12/2001 |
| WO | 2005045273 A1 | 5/2005 |
| WO | 2009003659 A3 | 1/2009 |
| WO | 2009043398 A1 | 4/2009 |
| WO | 2009087001 A1 | 7/2009 |
| WO | 2010031582 A1 | 3/2010 |
| WO | 2010108671 A1 | 9/2010 |
| WO | 2010136200 A2 | 12/2010 |
| WO | 2011050933 A1 | 5/2011 |
| WO | 2012059586 A1 | 5/2012 |

* cited by examiner

BRAKE DISC ASSEMBLY FOR A WHEEL

CROSS REFERENCE TO RELATED APPLICATION

This application claims priority to U.S. Provisional Application No. 61/811,316 filed Apr. 12, 2013, and is incorporated herein in its entirety.

BACKGROUND OF THE INVENTION

Field of the Invention

The present disclosure relates to a brake disc for a rotating member, such as a wheel, and, more specifically, to an annular brake disc formed from a plurality of interconnected brake disc segments.

Description of Related Art

Brake discs are affixed to wheels for the purpose of providing a smooth, hard contact surface that can be contacted by a brake shoe or pad controlled by a brake mechanism, such as a brake jaw. When contact between the disc and shoe or pad is established, friction between the elements is sufficient to reduce or entirely inhibit rotation of the wheel. Disc brakes are commonly used in a variety of applications including, for example, industrial machines, such as cranes and lifts, as well as in conveying installations, such as escalators, elevators, ski-lifts, and the like. Disc brake assemblies are also employed in transport vehicles, such as rail cars, public transportation vehicles, trucks, and automobiles.

It is well known that significant heat is created as a result of the frictional contact between the brake shoe and brake disc. The heat may cause thermal expansion of portions of the brake assembly and may cause the brake assembly to deform or degrade following prolonged use. More particularly, known braking apparatus often do not permit uniform distribution of the generated heat leading to wide temperature gradients across the braking assembly. Such temperature gradients may cause fissures and cracks to form in the brake disc. Additionally, cooling air flow is often neither uniform nor adequate to counteract the destructive effects of the heat being generated. Instead, cooling air may actually increase temperature gradients on the brake disc, worsening thermal transitional phenomena. Additionally, a considerable amount of the heat created on the contact surface of the brake element is transferred to the shaft on which the brake disc is mounted. This transferred heat may cause oxidation to occur on the shaft and/or wheel making replacing brake elements more difficult. Prolonged heat exposure also alters the centering or calibration of the brake elements and/or drive members, further affecting performance of the brake system and wheel.

To make the brake linings and/or brake discs more accessible and to simplify maintenance, brake discs have been developed that are formed from two or more interlocking segments or friction rings, which can be individually removed and replaced. For example, U.S. Pat. No. 4,132,294 to Poli, incorporated herein by reference, discloses a disc brake including two or more linings disposed about a central hub. The outer sides of the linings are configured to be contacted by a brake shoe and function in the conventional manner. The inner side of the lining includes a plurality of radial cooling ribs for dissipating heat. The disc brake is connected to a disc brake positioned on the opposite side of the wheel or to the wheel itself by a fastener or screw inserted through a hole in the lining. The disc brake is configured to affix to the wheel such that the inner surface of the lining is in contact with a surface of the wheel.

Other segmented disc brakes are known in which individual segments are spaced apart by a gap to permit the segments to expand when exposed to heat. For example, U.S. Pat. No. 5,788,026 to Poli, incorporated herein by reference, discloses a disc brake having a number of brake disc segments affixed to a rotating body to form an annular ring. Corresponding segments of disc brakes are attached to one another by fasteners extending through holes in the segments and rotating body. The segments are also slidably connected to adjacent segments in the annular disc brake by joining elements or pins extending from a socket of a segment to a corresponding socket of the adjacent segment. In this way, the segments may move and expand in response to heat, friction, and pressure caused by contact between the disc brake and brake mechanism.

However, in such braking systems the segments are free to move as pressure is applied. For example, increased pressure may push the segments in the circumferential or radial direction relative to the wheel hub causing the segment to become poorly aligned with the brake shoe. Thus, when the brake shoe contacts the misaligned segment, the segment may be bent or damaged. The segment may also wear in an unanticipated pattern, which further increases failure rates. The misaligned segment may also rub against the wheel surface causing a screeching sound or other undesirable noise.

SUMMARY OF THE INVENTION

In view of the foregoing, the rotating body and brake assembly of the present disclosure is a segmented brake disc that is less susceptible to damage caused by thermal expansion. Furthermore, while the brake disc is permitted to expand, movement of individual segments in the circumferential and radial directions is restricted to prevent a brake shoe from contacting misaligned segments. As a result of such modifications, the provided brake disc assembly is less susceptible to wear-based damage and operates more quietly than known alternative systems.

Generally, this disclosure is directed to a brake assembly and rotating body that addresses or overcomes some or all of the deficiencies and drawbacks associated with existing braking systems. Therefore, according to one aspect of the invention, a brake disc is provided. The brake disc includes a plurality of arcuate segments arranged to form a ring and a plurality of joining elements for connecting the segments to adjacent segments. Each segment includes: an inner side configured to contact a surface of a wheel; an outer side having a braking surface for contacting a braking mechanism; at least one socket on each radial end of the segment for receiving one of the plurality of joining elements; and a groove on the inner side of the segment configured to receive a coupling member to form a pivot joint for positioning the segment on the surface of the wheel.

In certain embodiments, the coupling member includes a head configured for insertion in the segment groove. In that case, the pivot joint may be a condyloid joint. Alternatively, the pivot joint is a ball and socket joint.

In certain further embodiments, the disc includes a plurality of transverse through holes extending between the inner side and the outer side of the segment configured to receive fasteners to connect the segment to the wheel. Additionally, each segment may include two sockets on each radial end of the segment. In that case, each of the plurality of joining elements may be slidably received within a respective socket. Furthermore, a depth of each socket may be greater than a length of the joining elements, thereby allowing the joining element to slide entirely into the socket.

In certain embodiments, the disc includes six segments and adjacent segments are separated by a radial gap. The segments may be movable, with respect to the joining elements, to expand or reduce a width of the gap. The segment may include at least one protrusion extending from the inner side of the segment for directing cooling air to the inner side of the segment. The protrusions may include radial fins extending between an inner circumferential side and an outer circumferential side of the segment.

According to another aspect of the invention, a brake assembly is provided. The assembly includes a wheel having a central hub, an outer rim, and a body extending between the hub and the rim. The body has a front side surface and a rear side surface. The brake assembly also includes a front brake disc connected to the front side surface of the body and a rear brake disc connected to the rear side surface of the body. Each brake disc includes a plurality of arcuate segments arranged to form a ring and a plurality of joining elements for connecting the segments to adjacent segments. Each segment includes: an inner side configured to contact the front side surface or rear side surface of the body of the wheel; an outer side comprising a braking surface for contacting a braking mechanism; at least one socket located on each radial end of the segment for receiving the joining element; and a groove on the inner side of the segment configured to receive a coupling member to form a pivot joint for positioning the segment on the front side surface or the rear side surface of the wheel.

In certain embodiments, the coupling member comprises a head on each longitudinal end thereof and a shaft extending therebetween. A groove of at least one segment may define an ellipsoid cavity configured to receive the head of the coupling member to form a condyloid joint. Alternatively, the groove may define a partially spherical cavity configured to receive the head of the coupling member to form a ball and socket joint. In certain embodiments, the coupling member extends through a hole in the body of the wheel, such that one end of the coupling member is inserted in a groove of a segment of the front brake disc and the other end of the coupling member is inserted in a groove of a segment of the rear brake disc.

In certain embodiments, each segment further includes at least one transverse through hole extending between the inner side and the outer side of the segment. In that case, the assembly may also include a fastener inserted through each through hole for connecting the front brake disc to the rear brake disc through a corresponding through hole in the body of the wheel. In certain embodiments, each segment may include two transverse through holes located on a center axis of the segment.

The foregoing and other features and characteristics, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Some of the advantages and features of the preferred embodiments of the invention have been summarized hereinabove. These embodiments, along with other potential embodiments of the device, will become apparent to those skilled in the art when referencing the following drawings in conjunction with the detailed descriptions as they relate to the figures.

DETAILED DESCRIPTION OF THE PREFERRED EMBODIMENTS

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention. Further, for purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures.

However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. For the purpose of facilitating understanding of the invention, the accompanying drawings and description illustrate preferred embodiments thereof, from which the invention, various embodiments of its structures, construction and method of operation, and many advantages may be understood and appreciated.

The present disclosure is directed to a rotating body and brake disc. The rotating body may be any wheel structure, including a railway vehicle wheel, a wheel for a truck or automobile, or a wheel for various industrial machines. A brake disc refers to a structure adapted to connect to the surface of one or both sides of the rotating body. The brake disc is configured to be contacted by a braking mechanism, such as a brake jaw, brake pad, or brake shoe. Friction between the brake disc and shoe inhibits rotation of the rotating body.

Figure 1:
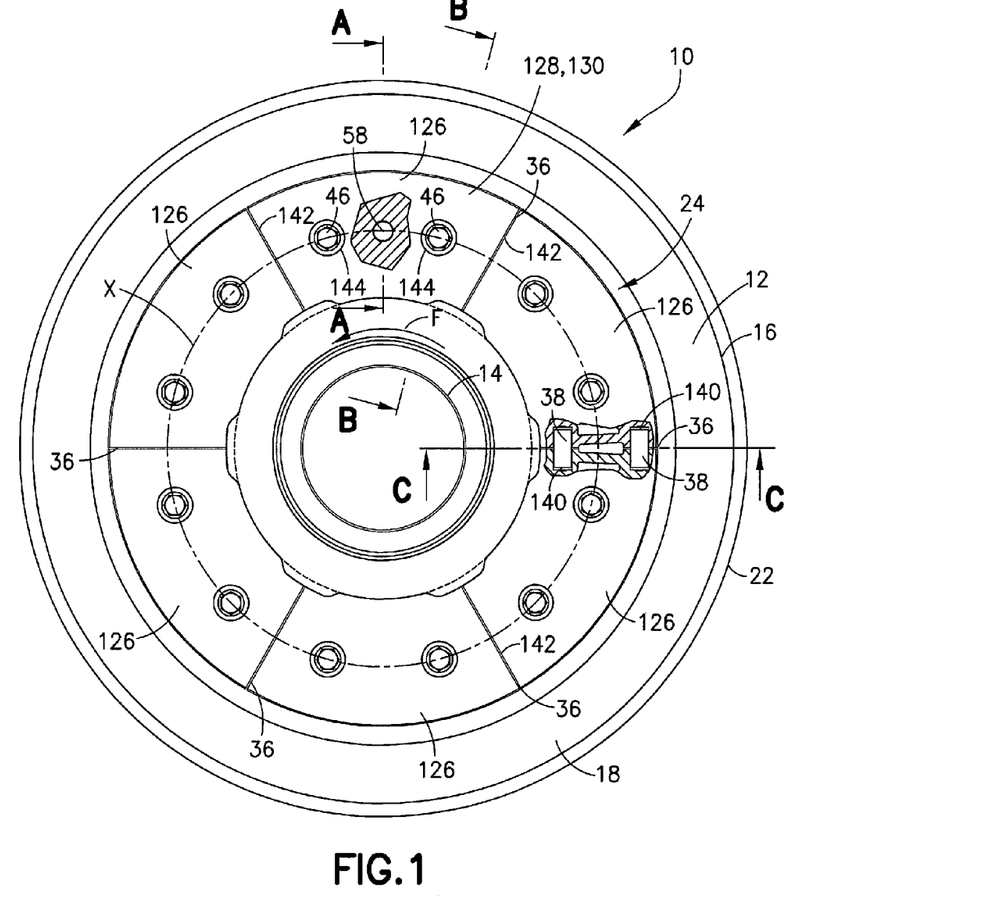
FIG. 1 is a front and partially perspective view of an embodiment of a brake disc connected to a wheel.

With reference to FIG. 1, a rotating body, such as railway wheel 10 is shown in accordance with one embodiment. The wheel 10 includes a body 12 extending between a hub 14 and outer rim 16. The body 12 includes a front side surface 18 and a rear side surface 20 (shown in FIGS. 4A, 5, and 6). The outer rim 16 may include a tread 22, configured to engage a rail (not shown). The body 12 may include regions having different thicknesses or rigidity. For example, the body 12 may include alternating concentric bands (not shown) having high and low rigidity. The rigidity of the various regions may result from varying either the thickness or material composition of the body 12.

Figure 3:
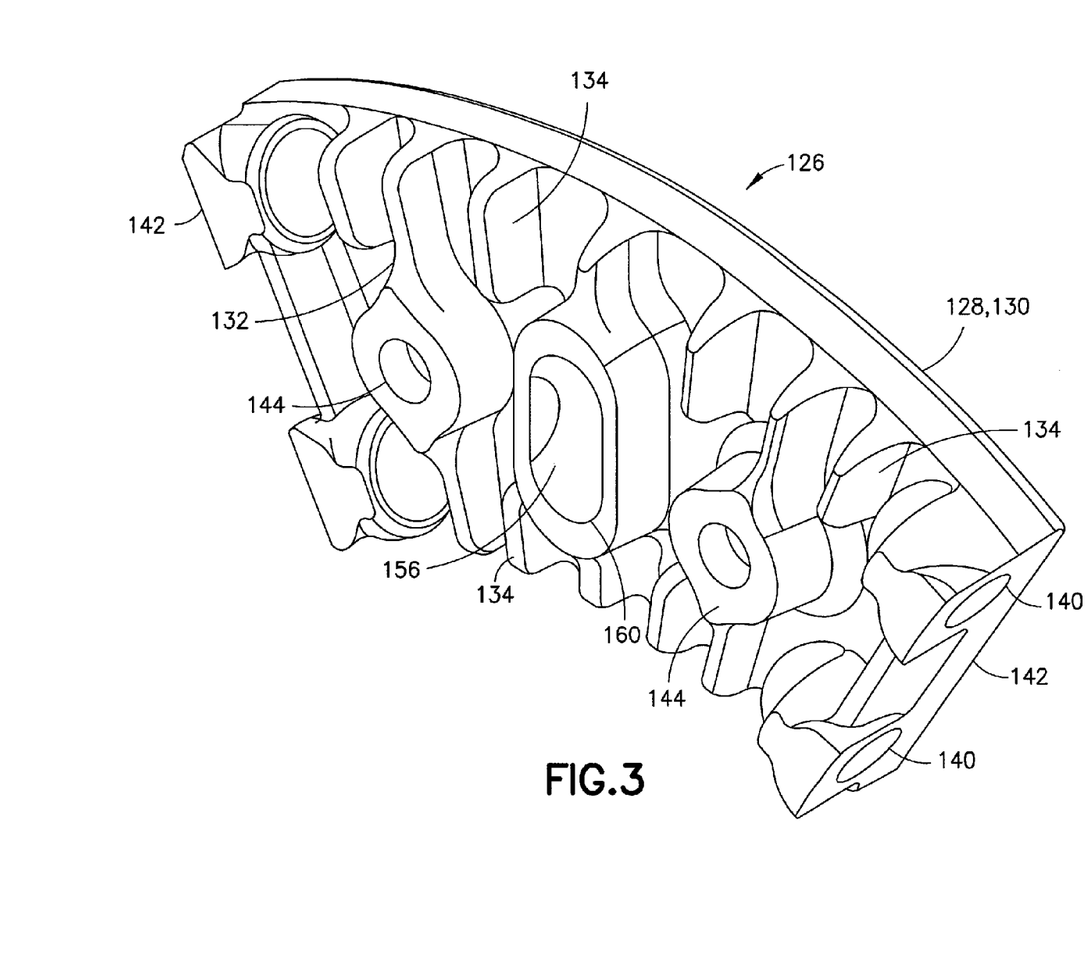
FIG. 3 is a rear perspective view of a segment of the brake disc of FIG. 1.
Figure 4A:
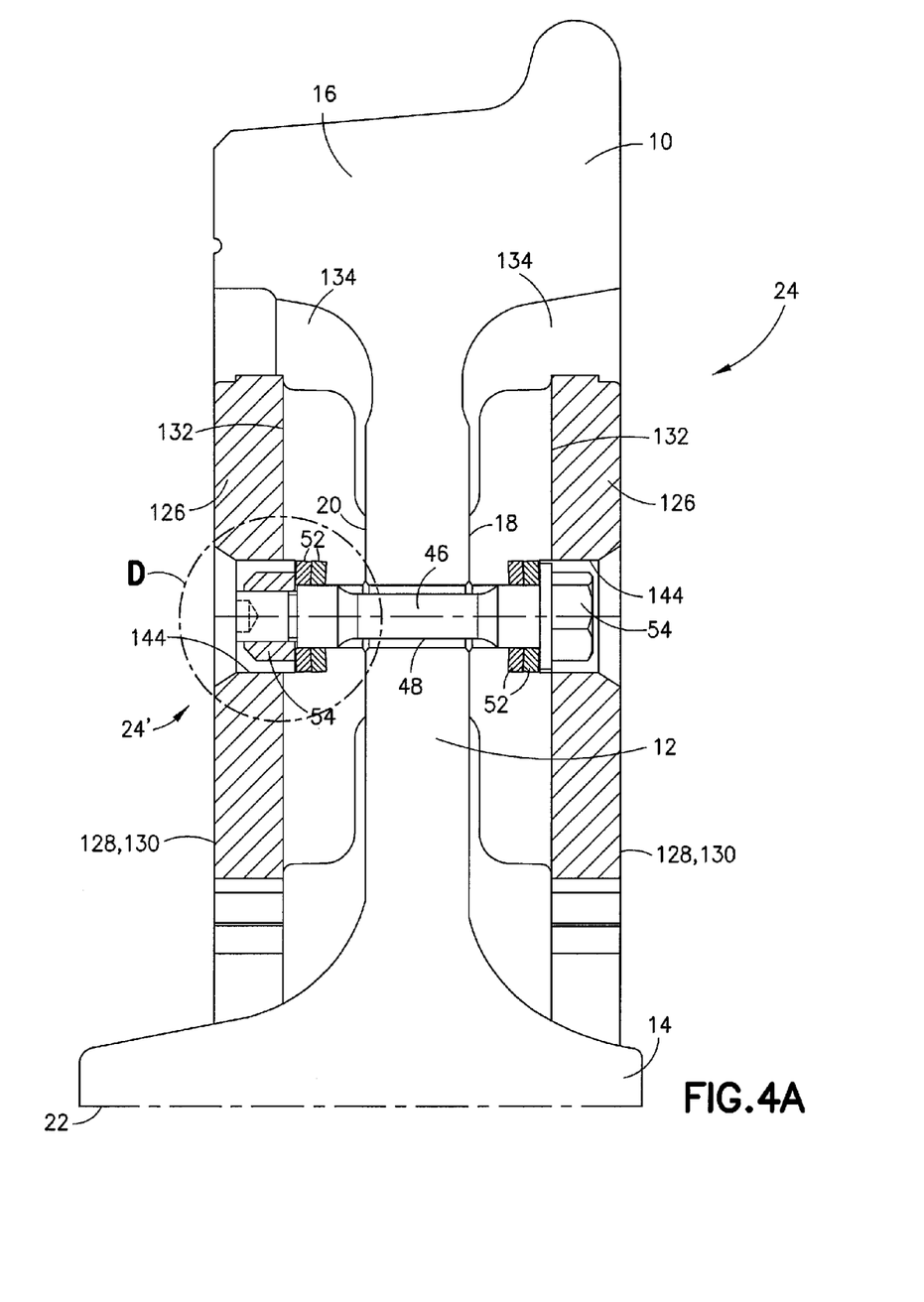
FIG. 4A is a cross-sectional view of the brake disc of FIG. 1 along line B-B in FIG. 1.
Figure 4B:
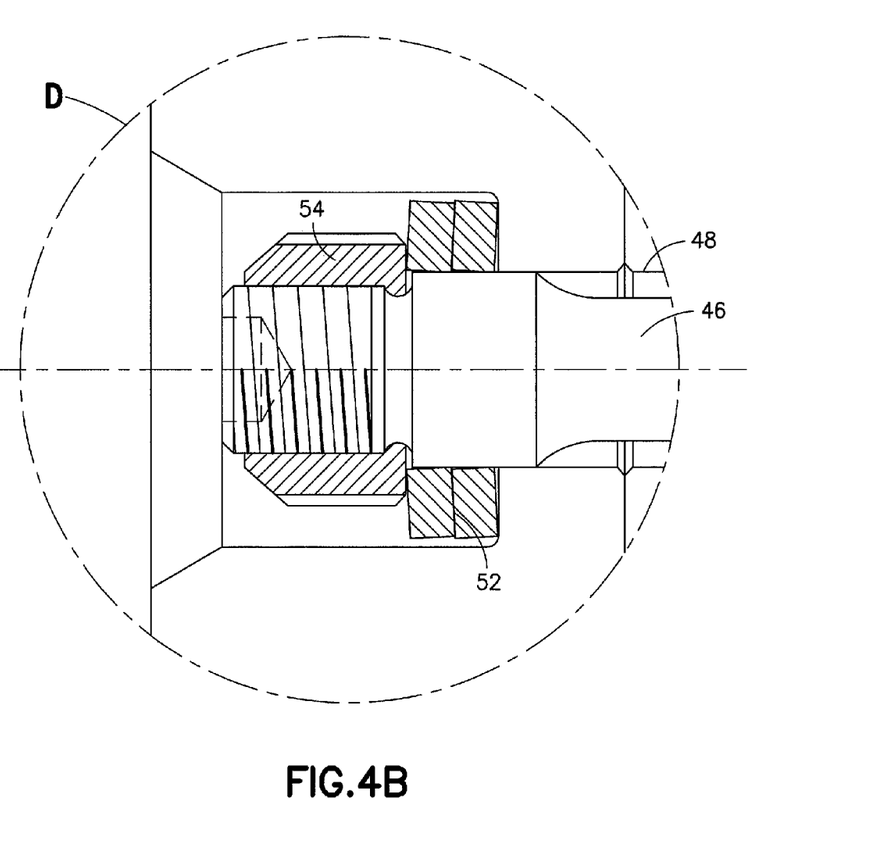
FIG. 4B is detail view of the brake disc of FIG. 4A from the encircled detail area labeled D in FIG. 4A.
Figure 5:
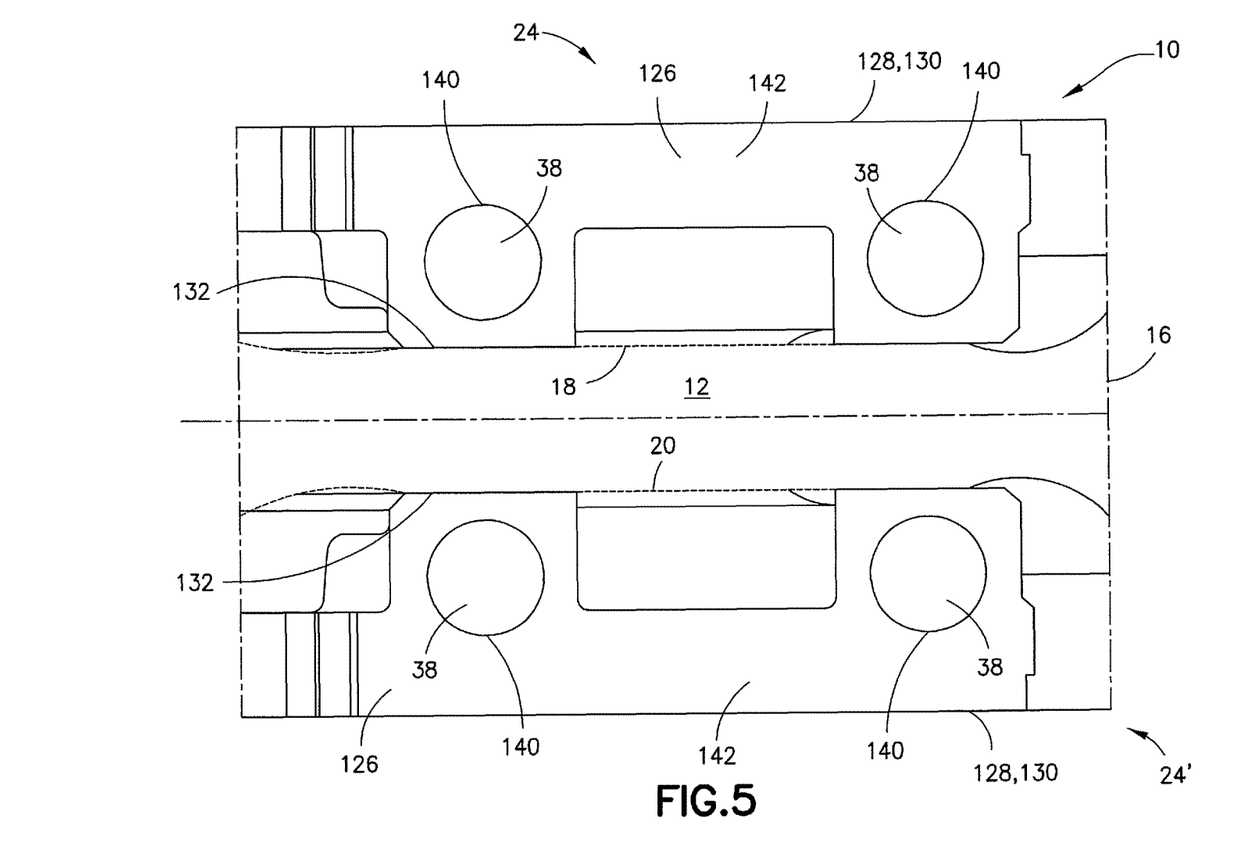
FIG. 5 is a cross-sectional view of the brake disc of FIG. 1 along line C-C in FIG. 1.

As shown, for example, for example, in FIG. 4A, a front brake disc 24 is connected to the front side surface 18 of the wheel 10 and a rear brake disc 24' is connected to the rear side surface 20. The front brake disc 24 and the rear brake disc 24' may be arranged so that corresponding segments 126 of the brake discs 24, 24' are aligned through the wheel 10. Generally, it is preferable to affix the brake discs 24, 24' to more rigid regions of the wheel body 12 to improve braking performance. The brake discs 24, 24' are formed of arcuate segments 126 connected around the hub 14 of the wheel 10 to form a closed annular ring, which may be referred to as a friction ring. The segments 126 may be identical in shape and size or may have different shapes and sizes, depending on performance and space requirements for the wheel and/or braking mechanism. The number of segments 126 may be even or odd. For example, the front brake disc 24 illustrated in FIG. 1 has six identical segments configured to form a ring. Each segment 126 includes an outer side 128, which functions as a standard braking surface 130. The braking surface 130 is configured to be contacted by a brake shoe or pad controlled by a braking mechanism. An inner side 132 (shown in FIG. 3) is located opposite the outer side 128 of the segment 126. The inner side 132 is configured to contact the front side surface 18 or rear side surface 20 of the wheel body 12 to impart the braking force along the wheel surface in the circumferential direction.

Figure 2:
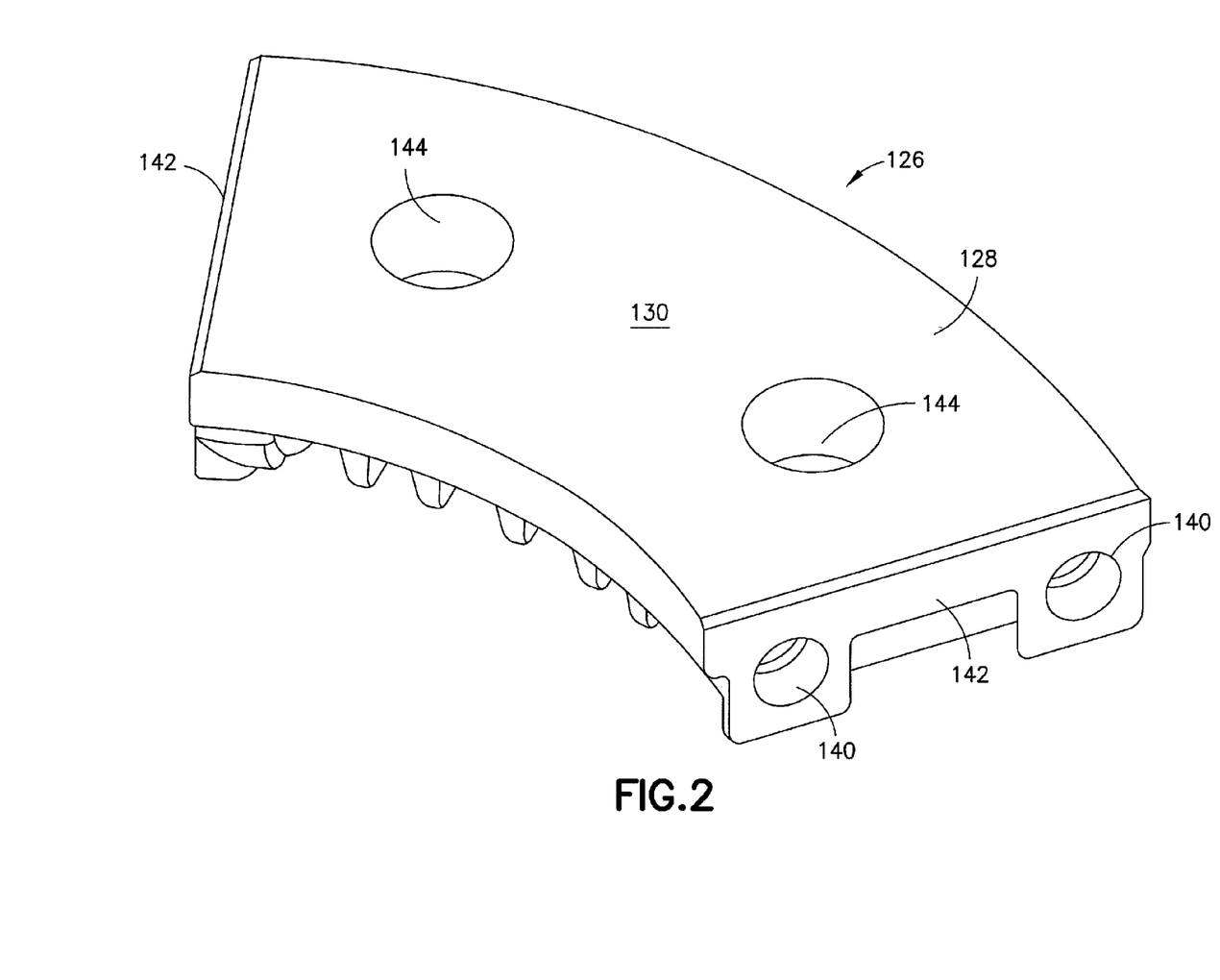
FIG. 2 is a front perspective view of a segment of the brake disc of FIG. 1.

With reference to FIGS. 2 and 3, the inner side 132 may include protrusions 134, such as fins, extending from the inner side 132 of the segment 126. The protrusions 134 are effective for cooling the segment during use. Particularly, the protrusions 134 separate the segment 126 from the front side surface 18 or rear side surface 20 (shown in FIG. 4A) of the wheel 10, allowing air to pass through the open space. The air effectively cools the segment 126 and provides a more even temperature gradient during use. In certain embodiments, as shown in FIG. 3, the protrusions 134 extend radially outward from a inner circumferential side of the segment 126 to an outer circumferential side of the segment 126. In that case, the protrusions 134 form channels for directing airflow radially away from the brake discs 24, 24'.

Having generally described the structure of the brake disc 24 and arcuate segments 126, various structures for connecting adjacent segments 126 to each other, to corresponding segments 126 on the rear brake disc 24' on the other side of the wheel 10, and to the body 12 of the wheel 10, will now be described in detail. More specifically, the segment 126 includes a number of holes and grooves extending from the inner side 132 thereof. The holes and grooves are configured to receive various fasteners, pins, coupling members, and joining elements.

With reference to FIGS. 1-3 and 5, the segments 126 are separated from one another by a radial gap 36 (shown in FIG. 1) between the radial ends 142 of adjacent segments 126 so that the segments 126 can freely expand or contract depending on the temperature and force applied by the brake shoe or pad. The segments 126 are connected together by joining elements 38 extending across the gap 36. The joining element 38 may be a pin, fastener, or slider as is known in the art. The joining elements 38 are configured to be inserted in sockets 140 extending inward from the radial ends 142 of each segment 126, such that each joining element 38 extends between corresponding sockets 140 of adjacent segments 126. In one embodiment, the depth of each socket 140 is greater than the length of the associated joining element 38. Accordingly, the segments 126 are free to move, relative to the joining elements 38, causing the joining element 38 to insert farther into one segment 126 and to pull away from the adjacent segment 126. The sockets 140 have a generally circular cross-section and are equidistant from the central axis X (shown on FIG. 1) of the segment 126. In one embodiment, each radial end 142 of each segment 126 includes two sockets 140 in a side-by-side arrangement. Including two sockets 140 on each radial end 142 restricts rotation of the segments 126 relative to one another and assists in limiting movement of the segments 126 in the radial direction.

With reference to FIGS. 1-4B, the segments 126 further include transverse through holes 144 extending between the outer side 128 and inner side 132 of the segment 126. The holes 144 are configured to receive a fastener 46, such as a screw or bolt. The fasteners 46 may connect the segment 126 to the body 12 of the wheel 10. Alternatively, as shown in FIG. 4A, the fasteners 46 may extend through the wheel body 12 to a corresponding segment 126 on the opposite side of the wheel 10. In one embodiment, as shown in FIG. 1, each segment 126 includes two such through holes 144 having a circular cross-section. The holes 144 are positioned along the central longitudinal axis X of the segment 126 and are equidistant from the segment center.

With continuing reference to FIGS. 1-4B, the fastener 46 is inserted through the hole 144, and rigidly and fixedly connects the segment 126 positioned on the front brake disc 24 to a corresponding segment 126 of the rear brake disc 24'. A top portion of the fastener 46 may be recessed within the transverse through hole 144 so that it does not extend above the hole opening. Recessing the fastener 46 ensures that it does not contact or obstruct the brake shoe or brake pad of the brake mechanism. The fastener 46 may be connected to the segment 126 with a washer 52 and a nut 54 or with other fastening and connecting structures, as are known in the art. In an alternative embodiment, the holes 144 may not be included on the body of the segments 126. Instead, the segment 126 may include additional structural elements, such as appendices or brackets (not shown) connected to and extending from the segments 126. The fasteners 46 may be inserted through holes in the appendices or brackets.

Figure 6:
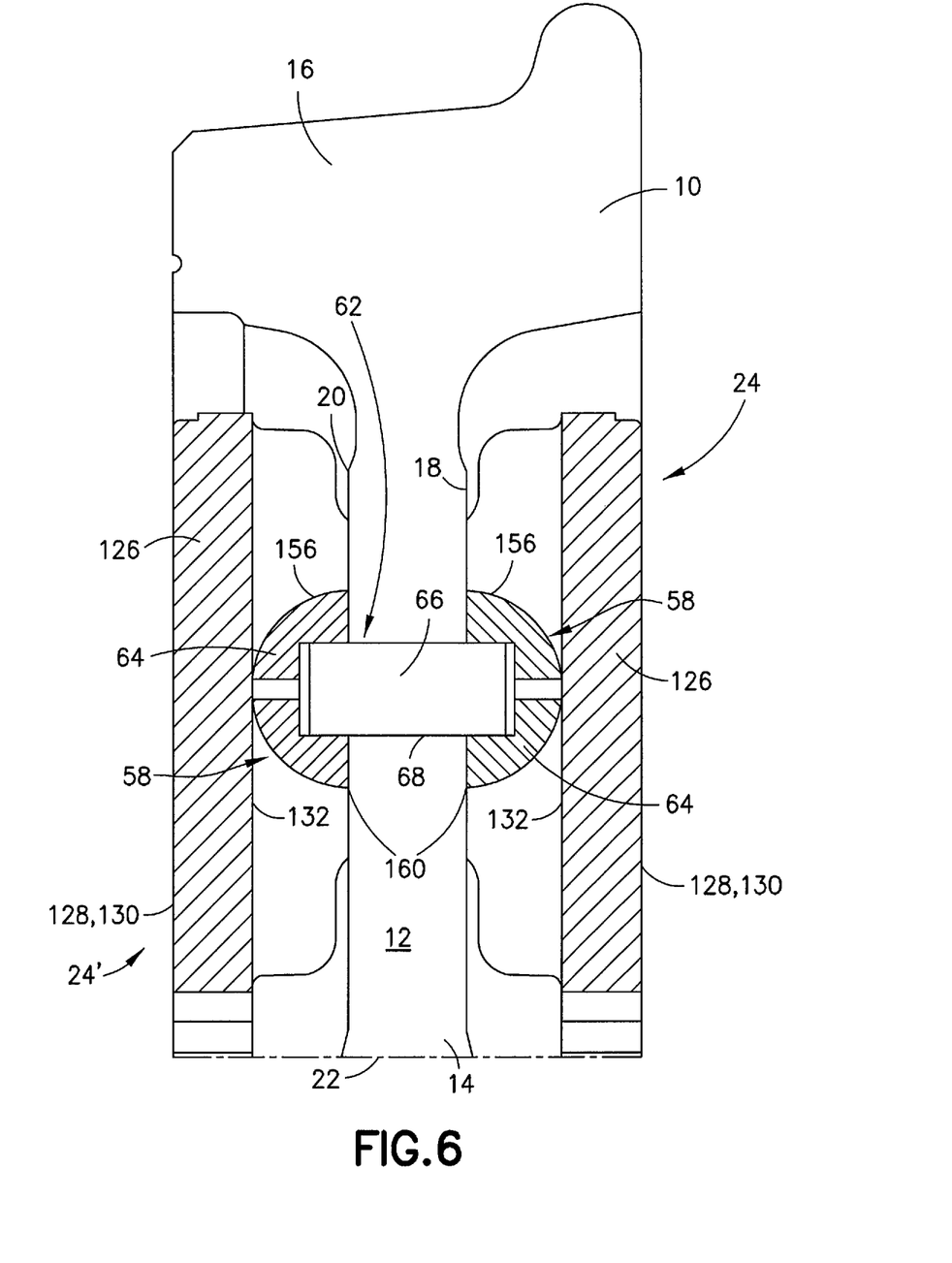
FIG. 6 is a cross-sectional view of the brake disc of FIG. 1 along line A-A in FIG. 1.

With reference to FIGS. 1, 3, and 6, the segment 126 further includes a groove 156 adapted to receive a coupling member 62 to form a pivot joint 58. As will be described hereinafter, the pivot joint 58 prevents the segment 126 from sliding radially outward along the surface of the wheel 10 as a result of centripetal force and thermal expansion. The coupling member 62 may include a head 64 located on each end of the coupling member 62 shaped to be inserted in the groove 156, and a cylindrical shaft 66 extending therebetween. The head 64 and shaft 66 may be separate members connected together by a known fastener or adhesive or may be integrally formed. The groove 156 includes an opening 160 extending inward from the inner side 132 of the segment 126. The head 64 of the coupling member 62 is shaped for insertion through the opening 160 into the groove 156. Once the coupling member 62 is inserted in the groove 156, the segment 126 is permitted to freely rotate in at least one direction about the head 64. The shaft 66 of the coupling member 62 may be inserted into a through hole 68 extending from the front side surface 18 to the rear side surface 20 of the wheel body 12. In this configuration, one end of the coupling member 62 is inserted in a groove 156 of a segment 126 of the front brake disc 24 and the other end of the coupling member 62 is inserted in a groove 156 for the corresponding segment 126 of the rear brake disc 24'.

In a non-limiting embodiment, the pivot joint 58 is an ellipsoid or condyloid joint. In that case, the head 64 of the coupling member 62 is an ellipsoid configured for insertion in the groove 156 through an elliptical opening 160. A condyloid joint is freely rotatable along the latitudinal and longitudinal axis of the groove 156. However, the condyloid joint prevents the segment 126 from twisting or rotating. In an alternative embodiment, the pivot joint 58 may be a ball and socket joint (e.g., spherical joint) having a circular opening 160 that would also permit twisting rotation about the head 64. Each segment 126 includes its own groove 156 and is configured to receive a corresponding coupling member 62. Accordingly, each segment 126 is permitted to rotate in the directions permitted by the pivot joint 58, but is prevented from sliding radially inward or outward along the wheel side surfaces 18, 20.

More specifically, the pivot joint 58 effectively creates a fixed point around which the segment 126 can expand or contract. Including a pivot joint 58 prevents radial displacement of the segment 126 during thermal expansion, ensuring that the segment 126 is properly aligned with the brake pad or shoe and preventing wear to the edges of the segments caused by improper alignment. Similarly, the pivot joint 58 is effective for maintaining the segment 126 in the desired position by resisting centripetal force caused by rotation of the wheel 10 about the hub 14, which tends to force the segment 126 toward the outer rim 16. The pivot joint 58 also effectively transmits the braking force applied by the brake mechanism to the wheel to restrict wheel rotation. Finally, since the head 64 of the coupling member 62 is not fixedly connected to the segment 126, but merely rests within the corresponding groove 156, lateral deformation of the wheel body 12 is not transmitted to the segment 126. Since such deformation of the wheel body 12 is not transmitted to the segment 126, structural integrity of the segment 126 is preserved. Specifically, the segment 126 is protected from bending, improper wear, misalignment with the brake shoe, or other deforming forces that would weaken the segment 126 following prolonged use.

With reference to FIG. 1, in use, a braking force F is applied to corresponding segments 126 of the front brake disc 24 on the front 18 and the rear brake disc 24' (shown in FIG. 4A) on the rear 20 side surfaces of the wheel 10 by the brake shoes or pads of a brake mechanism. The braking force F is transmitted to the wheel 10 by both the inner side 132 of the segment 126 and coupling member 62. More particularly, the force F is applied in the circumferential direction causing the segments 126 contacted by the brake shoe or pads to pivot thereby transmitting force to adjacent segments 126 as well. Since the segments 126 are slidably connected by the joining elements 38, the segments 126 are permitted to pivot or rotate in response to the applied force. However, since forces applied to adjacent segments 126 on opposite sides of the contacted segment 126 are equal in force, but opposite in direction, rotation of the segments 126 is restricted. Therefore, the segments 126 are effectively locked together, meaning that the brake discs 24, 24' function as continuous or unitary structures, even though the segments 126 are separated by the radial gap 36.

As force F is applied to the segments 126, heat is created causing the contacted segment 126 to expand. The segments 126 are also exposed to centripetal forces that tend to push the segments 126 radially outward toward the outer rim 16 of the wheel 10. However, even as the segment 126 expands, it is prevented from sliding as a result of the contact between the groove 156 and head 64 of the coupling member 62. In this way, the pivot joint 58 is a fixed point around which the segment 126 can expand. Beneficially, radial displacement of the segment 126 is effectively prevented. Instead, the segment 126 is only permitted to pivot or rotate in directions restricted by the shape of the pivot joint 58.

While specific embodiments of the brake disc and rotating body have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. Further, although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A brake disc comprising:
    a plurality of arcuate segments arranged to form a ring and a plurality of joining elements for connecting the segments to adjacent segments, wherein each segment comprises:
    an inner side configured to contact a surface of a wheel;
    an outer side comprising a braking surface for contacting a braking mechanism;
    at least one socket on each radial end of the segment for receiving one of the plurality of joining elements; and
    a groove on the inner side of the segment configured to receive a head portion of a coupling member to form a pivot joint between adjacent segments for positioning the segment on the surface of the wheel.

2. The brake disc of claim 1, wherein each of the plurality of joining elements is slidably received within a respective socket.

3. The brake disc of claim 2, wherein a depth of each socket is greater than a length of the joining elements, thereby allowing the joining element to slide entirely into the socket.

4. The brake disc of claim 1, further comprising at least one protrusion extending from the inner side of the segment for directing cooling air to the inner side of the segment.

5. The brake disc of claim 4, wherein the at least one protrusion comprises a radial fin extending between an inner circumferential side and an outer circumferential side of the segment.

6. The brake disc of claim 1, wherein each segment comprises two sockets on each radial end of the segment.

7. The brake disc of claim 1, wherein the pivot joint is a condyloid joint.

8. The brake disc of claim 1, wherein the pivot joint is a ball and socket joint.

9. The brake disc of claim 1, wherein the brake disc comprises six segments.

10. The brake disc of claim 1, wherein adjacent segments are separated by a radial gap, and wherein the segments are movable, with respect to the joining elements, to change a width of the radial gap.

11. The brake disc of claim 1, further comprising a plurality of transverse through holes extending between the inner side and the outer side of the segment configured to receive fasteners to connect the segment to the wheel.

12. The brake disc of claim 1, wherein the groove comprises a concave surface extending inwardly from the inner side of the segment.

13. A brake assembly comprising:
a wheel having a central hub, an outer rim, and a body extending between the hub and the rim, the body having a front side surface and a rear side surface;
a front brake disc connected to the front side surface of the body;
a rear brake disc connected to the rear side surface of the body; and
a plurality of coupling members extending between the front brake disc and the rear brake disc, each coupling member comprising a head portion at each longitudinal end thereof,
wherein each brake disc comprises a plurality of arcuate segments arranged to form a ring and a plurality of joining elements for connecting the segments to adjacent segments and wherein each segment comprises:
an inner side configured to contact the front side surface or rear side surface of the body of the wheel;
an outer side comprising a braking surface for contacting a braking mechanism;
at least one socket located on each radial end of the segment for receiving the joining element; and
a groove on the inner side of the segment configured to receive the head portion of one of the plurality of coupling members to form a pivot joint between adjacent segments for positioning the segment on the front side surface or the rear side surface of the wheel.

14. The brake assembly of claim 13, wherein each coupling member further comprises a shaft extending between the head portions of the coupling member.

15. The brake assembly of claim 13, wherein the groove of each segment defines an ellipsoid cavity configured to receive the head portion of one of the coupling members to form a condyloid joint.

16. The brake assembly of claim 13, wherein the groove of each segment defines a partially spherical cavity configured to receive the head of one of the coupling members to form a ball and socket joint.

17. The brake assembly of claim 13, wherein each coupling member extends through a hole in the body of the wheel, and wherein one end of the coupling member is inserted in a groove of a segment of the front brake disc and the other end of the coupling member is inserted in a groove of a corresponding segment of the rear brake disc.

18. The brake assembly of claim 13, wherein each segment further comprises at least one transverse through hole extending between the inner side and the outer side of the segment, and wherein the assembly further comprises a fastener inserted through each through hole for connecting the front brake disc to the rear brake disc through a corresponding through hole in the body of the wheel.

19. The brake assembly of claim 18, wherein each segment comprises two transverse through holes located on a center axis of the segment.

20. The brake disc assembly of claim 13, wherein the groove comprises a concave surface extending inwardly from the inner side of the segment.

21. The brake assembly of claim 20, wherein the head portion of each coupling member comprises a convex outer surface with a which corresponds to the concave surface of the groove and which is configured to be inserted into the groove of the segment.

* * * * *